(12) United States Patent
Xiang et al.

(10) Patent No.: US 11,326,093 B2
(45) Date of Patent: May 10, 2022

(54) FRACTURING FLUIDS CONTAINING HYDROPHILIC FIBERS

(71) Applicant: SCHLUMBERGER TECHNOLOGY CORPORATION, Sugar Land, TX (US)

(72) Inventors: Changsheng Xiang, Houston, TX (US); Mohan Kanaka Raju Panga, Sugar Land, TX (US); Valerie Gisele Helene Lafitte, Sugar Land, TX (US); Zachary McCathran, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 15/575,530

(22) PCT Filed: May 20, 2016

(86) PCT No.: PCT/US2016/033403
§ 371 (c)(1),
(2) Date: Nov. 20, 2017

(87) PCT Pub. No.: WO2016/187490
PCT Pub. Date: Nov. 24, 2016

(65) Prior Publication Data
US 2018/0127644 A1 May 10, 2018

Related U.S. Application Data

(60) Provisional application No. 62/164,674, filed on May 21, 2015.

(51) Int. Cl.
*E21B 43/267* (2006.01)
*C09K 8/80* (2006.01)
*C09K 8/66* (2006.01)
*C09K 8/70* (2006.01)
(Continued)

(52) U.S. Cl.
CPC .................. *C09K 8/80* (2013.01); *C09K 8/66* (2013.01); *C09K 8/70* (2013.01); *C09K 8/84* (2013.01); *C09K 8/92* (2013.01); *E21B 43/267* (2013.01); *C09K 2208/08* (2013.01); *C09K 2208/10* (2013.01)

(58) Field of Classification Search
CPC ............... C09K 8/80; C09K 8/66; C09K 8/70
USPC ...................................................... 166/280.2
See application file for complete search history.

(56) References Cited

U.S. PATENT DOCUMENTS

| | | |
|---|---|---|
| 3,788,405 A | 1/1974 | Taylor |
| 5,801,127 A | 9/1998 | Duhon, Sr. |
| 6,016,871 A | 1/2000 | Burts, Jr. |

(Continued)

OTHER PUBLICATIONS

International Search Report and Written Opinion issued in International Patent Appl. No. PCT/US2016/033403 dated Aug. 22, 2016; 12 pages.

*Primary Examiner* — William D Hutton, Jr.
*Assistant Examiner* — Ashish K Varma
(74) *Attorney, Agent, or Firm* — Cameron R. Sneddon (57) ABSTRACT

A fracturing fluid may include an aqueous base fluid; a proppant material; and hydrophilic fibers having a length of about 250 microns to 10 millimeters. A method of performing a fracturing operation may include injecting a fracturing fluid comprising hydrophilic fibers having a length of about 250 microns to 10 millimeters and proppant into a wellbore.

17 Claims, 3 Drawing Sheets

(51) Int. Cl.
*C09K 8/92* (2006.01)
*C09K 8/84* (2006.01)

(56) References Cited

U.S. PATENT DOCUMENTS

| | | | |
|---|---|---|---|
| 8,490,700 B2 | 7/2013 | Lesko et al. | |
| 8,731,889 B2* | 5/2014 | Du | E21B 43/267 |
| | | | 703/10 |
| 8,763,699 B2 | 7/2014 | Medvedev et al. | |
| 2004/0023816 A1* | 2/2004 | Burts, III | C09K 8/68 |
| | | | 507/200 |
| 2010/0175874 A1 | 7/2010 | Sullivan et al. | |
| 2012/0247764 A1* | 10/2012 | Panga | E21B 43/267 |
| | | | 166/280.2 |
| 2013/0220607 A1* | 8/2013 | Phatak | E21B 33/10 |
| | | | 166/279 |
| 2015/0101808 A1* | 4/2015 | Saini | C09K 8/68 |
| | | | 166/280.2 |

* cited by examiner

FRACTURING FLUIDS CONTAINING HYDROPHILIC FIBERS

CROSS-REFERENCE TO RELATED APPLICATION

This application claims the benefit of U.S. Provisional Application Ser. No. 62/164,674 filed May 21, 2015 entitled "Fracturing Fluids Containing Pulp" to Xiang et al. the disclosure of the provisional application is incorporated by reference herein in its entirety.

BACKGROUND

Hydrocarbons (e.g., oil, natural gas, etc.) may be obtained from a subterranean formation by drilling a wellbore that penetrates the hydrocarbon-bearing formation. Fracturing operations may be conducted in a wellbore to improve the production of fluids from the formation surrounding the wellbore. A variety of fracturing techniques can be employed, and available systems enable multi-stage stimulation to be performed along the wellbore. Hydraulic fracturing techniques generally involve pumping a fracturing fluid downhole and into the surrounding formation upon its fracture due to the high pressures involved.

More specifically, hydraulic fracturing techniques inject a fracturing fluid into a wellbore penetrating a subterranean formation thereby forcing the fracturing fluid against the wellbore walls at pressures high enough to crack or fracture the formation, creating or enlarging one or more fractures. Proppant present in the fracturing fluid is then entrained within the fracture by the ingress of the fracturing fluid into the created or enlarged crack, thereby preventing the fracture from closing and thus providing for the improved flow produced fluids from the formation. Proppant is thus used to hold the walls of the fractures apart in order to create conductive paths that can facilitate the flow of fluids through the formation and into the wellbore after pumping has stopped. Being able to place the appropriate proppant at the appropriate concentration to form a suitable proppant pack is thus important for the success of a hydraulic fracturing operation.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a fracturing fluid that includes an aqueous base fluid; a proppant material; and hydrophilic fibers having a length of about 250 microns to 10 millimeters.

In another aspect, embodiments disclosed herein relate to a method of performing a fracturing operation that includes injecting a fracturing fluid comprising hydrophilic fibers having a length of about 250 microns to 10 millimeters and proppant into a wellbore.

In yet another aspect, embodiments disclosed herein relate to a method of performing a fracturing operation that includes injecting a fracturing fluid having a first fiber material therein into a wellbore; and injecting a fracturing fluid having a second fiber material therein into the wellbore; wherein at least one of the first or the second fiber material is a hydrophilic fiber material that has a length of about 250 microns to 10 millimeters.

Other aspects and advantages of the claimed subject matter will be apparent from the following description and the appended claims.

DETAILED DESCRIPTION

Embodiments disclosed herein relate generally to fracturing fluid compositions and methods of using said compositions during hydraulic fracturing operations. More specifically, embodiments disclosed herein relate to fracturing fluid compositions that include hydrophilic fibers and methods of using said compositions.

As discussed above, hydraulic fracturing operations are used to create fractures in subterranean formations in order to increase their permeability and facilitate their release of oil and gas that may be trapped therein. To keep the fractures open after the release of the applied pressure, proppant is transported into the fractures by fluids that may include fibers to assist in the formation of proppant packs or pillars within the fracture. These proppant packs or pillars are desired because they localize masses of proppant throughout the fracture thereby providing sufficient support to keep the fracture open while also providing channels between the proppant pillars for the oil and gas to flow from the formation and into the wellbore for collection.

Conventionally, synthetic fibers may be used to assist in the formation of the proppant pillars. However, current manufacturing methods for synthetic fibers have limits to the shortest length achievable for the fibers. However, in order for fibers to be effective within a fracture they must be able to enter the fracture and in some instances the fracture width may be less than the shortest length achievable for synthetic fibers, which makes it difficult for even the smallest synthetic fibers to penetrate into the fracture. For example, a fracture width may decrease the further a fracture extends into a formation. Formations that have fractures with widths smaller than the fiber lengths can present problems for proppant placement within said fractures because the fibers that are attempted to be injected therein tend to be screened out and otherwise accumulate at the mouth or openings of the smaller fracture. Therefore, materials that enable efficient proppant transport into fractures, both large and small, are sought after to improve the efficiency of hydraulic fracturing operations.

In one or more embodiments, a fracturing fluid of the present disclosure comprises a hydrophilic fiber. For example, the hydrophilic fiber may be a cellulose based fiber such as pulp fiber or microfibrillated cellulose. Cellulose itself constitutes the most abundant renewable and environmentally friendly raw material available on earth. For example, raw materials including wood, recycled paper, and agricultural residues such as bagasse, cereal straw, bamboo, reeds, esparto grass, jute, flax, and sisal all are comprised of cellulose fibers that may be converted into a variety of product including pulp fiber. Depending on the particular application requirements, the raw material processing conditions may be altered to produce a variety of cellulose-based materials that vary in terms of dimension and shape. For example, pulp fibers may generally range from 1 micron to 10 millimeters in length, powdered cellulose may generally range from 1 micron to 1 millimeter, nanofibrillated cellulose may generally range from 100 nanometers to 1 micron, microfibrillated cellulose may generally range from 100 nanometers to 500 microns, and nanocrystalline cellulose may generally range from 50 nanometers to 1000 nanometers. The above length distributions, and any other dimensional details that follow, are all based off of the values for dry fibers. It is to be understood that the hydrophilic fibers of the present disclosure, upon their hydration from a dried state, may elongate and/or swell.

The worldwide annual output of pulp fiber is about 400 million tons, making pulp fiber one of the most abundant raw materials worldwide. Pulp production begins with raw material preparation, which may include debarking (for wood), chipping, depithing (for bagasse), among others. After the raw material preparation the lignin is stripped from the cellulosic fibers by mechanical, thermal, and/or chemical processes. Lignin is a three dimensional polymer that binds the cellulosic fibers together and with its removal from the raw material the cellulosic fibers are freed to act independently or for further processing (e.g., into paper, craft board, etc.). Importantly, pulp is a hydrophilic material that is highly flexible (i.e., has a low Young's modulus) and is available in a variety of fiber lengths and diameters. However, other hydrophilic fiber materials having the dimensions and material properties that allow their use in a wide range of fracture widths may be used in one or more embodiments.

In one or more embodiments, the hydrophilic fiber used may have a length with a lower limit of any of 250 microns, 325 microns, 400 microns, or 500 microns, with an upper limit of any of 3 millimeters, 4.5 millimeters, 6 millimeters, 8 millimeters, or 10 millimeters, where any lower limit can be used in combination with any upper limit. In one or more embodiments, a hydrophilic fiber sample may be further fractionated to achieve a more narrow length distribution within the ranges listed above. In one or more embodiments, the width (e.g., dimension opposite the length) of the hydrophilic fibers may be from about 10 microns to 50 microns, or from about 15 microns to 45 microns, or from about 20 microns to 40 microns. In one or more embodiments, the aspect ratio (length to width) of the hydrophilic fibers used in fracturing fluids of the present disclosure may be from about 5 to 1000, or from about 6.5 to 700, or from about 8 to 500, or from about 10 to 300.

The hydrophilic fibers of the present disclosure are more elastic and/or flexible than a comparably sized synthetic fiber. Without being bound by theory, the increased elasticity and/or flexibility of the hydrophilic fiber is believed to reduce the amount of bridging that occurs at the mouth/opening of fractures smaller than the hydrophilic fibers attempting to penetrate therein, thereby reducing the screening out of the hydrophilic fibers and facilitating their penetration into smaller fractures.

In one or more embodiments, the amount of hydrophilic fibers used in a fracturing fluid may be from about 1 lbs/1000 gallons fluid to about 100 lbs/1000 gallons fluid, or from about 5 lbs/1000 gallons fluid to about 75 lbs/1000 gallons fluid, or from about 10 lbs/1000 gallons fluid to about 50 lbs/1000 gallons fluid. The amount used may depend on the width of the fractures that are to be penetrated by the fracturing fluid. For example, in some embodiments the amount of hydrophilic fibers needed to effectively transport and place proppant within smaller width fractures may be less than that which is needed in larger width fractures due to the proppant size for smaller fractures being correspondingly smaller and the volume of smaller fractures being smaller.

In one or more embodiments, combinations of fibers (e.g., synthetic and hydrophilic and/or different types of hydrophilic fibers) may be used. For example, simply using one type or size of fiber for all fracture geometries may not achieve an optimized proppant transport and placement profile. For example, there is commonly a fracture width gradient within a formation, with the fracture width tending to be smaller the farther the fracture is from the wellbore. In these instances, some fibers may be too big to penetrate the smaller fractures and therefore cause bridging and/or plugging at the fracture opening/mouth. Conversely, some fibers may be too small to be able to anchor properly within larger fractures and suspend proppant therein.

Therefore, in one or more embodiments, the size of the fibers used in a particular fracturing operation may be tailored based upon estimated fracture widths obtained through modeling collected geo-mechanical formation data so that the dimensions of the fibers used are most effective for the size of the fractures they will encounter. In some embodiments, optimized proppant transport and placement profiles may be achieved when the ratio between the estimated fracture width ($Fr_w$) and the fiber length ($Fi_L$) (i.e., $Fr_w/Fi_L$) is within about 0.25 to 10, or about 0.5 to 8, or about 0.75 to 6, or about 1 to 4. Fracture width may be estimated according to rock mechanics models, for example. The above correlation may serve to provide for effective proppant suspension while also avoiding bridging at the fracture mouth/opening. In one or more embodiments, this relationship may also be used with cellulosic or synthetic fiber materials other than pulp fibers.

In one or more embodiments, multiple stages of pumping fracturing fluids may take place in sequence, with each stage using a fracturing fluid that has differing fiber lengths in order to target specific fracture sizes during each round. For example, a pumping sequence may include a stage where nano fibers, such as nanofibrillated cellulose, are pumped into the wellbore to transport and place proppant into the far-field narrow fractures (e.g., less than 0.5 mm fractures), a stage where fractionated pulp fibers are pumped into the wellbore to transport and place proppant into wider fractures (e.g., 0.5-2 mm fractures), and a stage where longer fibers, such as pulp fibers or synthetic polylactic acid (PLA) fibers or other synthetic fibers, are pumped into the wellbore to transport and place proppant into the wider near wellbore fractures (e.g., greater than 2 mm fractures).

Figure 1:
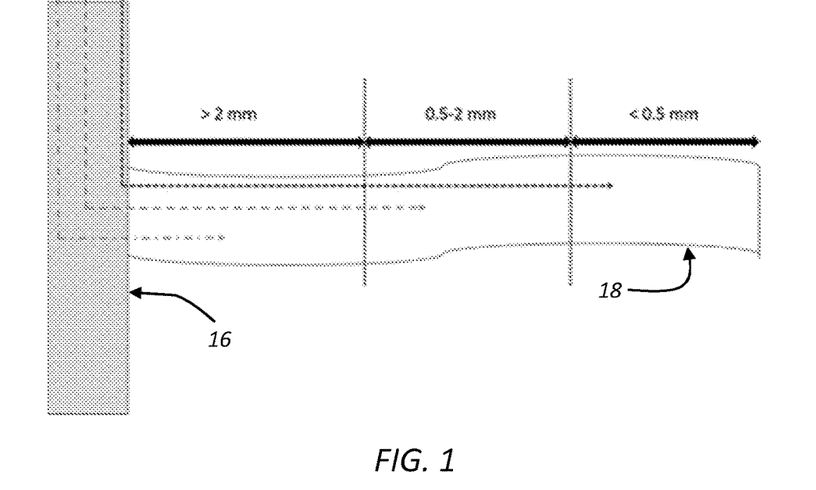
FIG. 1 is a general depiction of a multistage fracturing sequence according to one or more embodiments of the present disclosure.

FIG. 1 is a general depiction of the above sequence. Specifically, the fluid for the first stage 10 is pumped into the wellbore 16 and enters the fractured zone 18, proceeding deep into the fracture to transport proppant into the far-field fractures less than 0.5 mm in width. Then the fluid for the second stage 12 is pumped into the wellbore 16 and enters the fractured zone 18, proceeding into the fracture to transport proppant into the fractures between about 0.5 mm and 2 mm in width. Then the fluid for the third stage 14 is pumped into the wellbore 16 and enters the fractured zone 18, proceeding into the fracture to transport proppant into the near-wellbore fractures greater than about 2 mm in width. Thus, in one or more embodiments according to the present disclosure, a particular band of fracture widths is treated in a staged manner by pumping fluids that contain specifically selected fibers having lengths tailored to most effectively transport proppant and anchor into fractures.

In this way, narrower fractures may be targeted first followed by progressively wider fractures until the entire fracture profile has been addressed. However, in some embodiments, the reverse sequence may be used, and the larger fractures may be targeted first followed by progressively smaller fractures. Furthermore, it is envisioned that in actual operation, more than three stages of pumping using distinct fiber sizes may occur depending upon the site specific modeling of collected geo-mechanical formation data and the general complexity of the fracture distribution. In some embodiments, the length of the fibers used in each stage may be determined by the relationship of fracture width to optimal fiber length presented above.

In one or more embodiments, the fracturing fluid may include an aqueous base fluid, including fresh water, salt water, and/or brines. More specifically the fracturing fluid may be a low viscosity "slickwater" type fluid. In one or more embodiments, the fracturing fluid may include at least one of the following additives used in oilfield applications: friction reducers, clay stabilizers, biocides, thickeners, corrosion inhibitors, and/or proppant flowback control additives. In one or more embodiments, proppants may be included in the wellbore fluid. The type of proppant is not to be specifically limited and it is the express intent of this application that any examples known to those of skill in the art may be used.

In one or more embodiments, each particular stage may use a different fluid system (e.g., slickwater, linear gel, crosslinked gel etc.) as needed to effectively complete the proppant placement. For example, in one or more embodiments, slickwater may be used with nano fibers for far field narrow fractures, while crosslinked gel may be used with polymeric fiber (e.g. PLA) for larger near wellbore fractures.

In one or more embodiments, the fluid system may include a thickener selected from natural polymers including guar (phytogenous polysaccharide) and guar derivatives (e.g., hydroxypropyl guar and carboxymethylhydroxypropyl guar) and synthetic polymers including polyacrylamide copolymers. Additionally, viscoelastic surfactants that form elongated micelles are another class of non-polymeric viscosifiers that may be added to the fluid in addition to or independently from the polymeric thickeners. Other polymers and other materials, such as xanthan, scleroglucan, cellulose derivatives, polyacrylamide and polyacrylate polymers and copolymers, viscoelastic surfactants, and the like, can be used also as thickeners. For example, water with guar represents a linear gel with a viscosity that increases with polymer concentration.

In one or more embodiments, cross-linking agents may be added to fluid to crosslink the polymers and thereby increase the gel viscosity and/or create visco-elasticity. Crosslinking agents for guar, guar derivatives, and synthetic polymers including polyacrylamide type polymers include salts of boron, titanium, zirconium, and aluminum.

Proppants may comprise naturally occurring sand grains or gravel, man-made or specially engineered proppants, such as fibers, resin-coated sand, or high-strength ceramic materials, e.g. sintered bauxite. The proppant collects heterogeneously or homogenously inside the fracture to "prop" open the new cracks or pores in the formation. The proppant creates planes of permeable conduits through which production fluids can flow to the wellbore. By selecting proppants having a contrast in one of such properties such as density, size and concentrations, different settling rates will be achieved. The fracturing fluids are of high viscosity, and therefore capable of carrying effective volumes of proppant material.

In one or more embodiments, the fracturing fluids of the present disclosure may also include a biocide and/or a surfactant.

In hydraulic and acid fracturing, a first fluid called the pad may be injected into the formation to initiate and propagate the fracture. This is followed by a second fluid that contains a proppant to keep the fracture open after the pumping pressure is released. The hydrophilic fibers of the present disclosure may be included in either fluid, and in particular embodiments, may be included in the second fluid to help suspend proppants.

However, it is envisioned that the hydrophilic fibers may be used for carrying out a variety of subterranean treatments/wellbore operations including, but not limited to, drilling operations, diverting treatments, gravel packing, zonal isolation, or downhole delivery. Such operations are known to persons skilled in the art and involve pumping a wellbore fluid into a wellbore through an earthen formation and performing at least one wellbore operation while the wellbore fluid is in the wellbore. Depending on the type of operation being performed, the size of the fibers selected may vary, i.e., to form a plug in a diversion, longer fibers (relative to a fracture width) may be selected.

EXAMPLES

Proppant Suspension, Bridging, Changing Slot Size

Example 1—Fixed Static Slot Test

The performance of pulp as a fluid additive for proppant transportation was evaluated with a static slot test. A slot having dimensions of 195 mm (length)×145 mm (width)×3 mm (width) was made of plexiglass.

Figure 2:
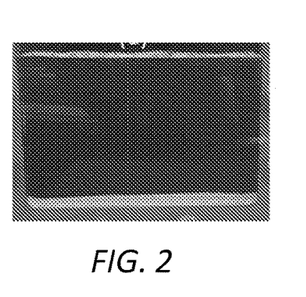
FIG. 2 is an image of the fluid, from Example 1, which has no pulp added to the base fluid formulation, after 10 seconds of its addition to the slot.

A base fluid of linear gel with 10 lbs guar/1000 gallons tap water was formulated. The proppant used was 40/70 CARBOLITE™ proppant, available from CARBO Ceramics Inc., at a loading of one lb proppant/gallon base fluid. FIG. 2 shows an image of a fluid that has no pulp added to the base fluid after 10 seconds of its addition to the slot. The proppant that has been added to the fluid is shown to have settled to the bottom of the cell (light colored layer at the bottom of the slot).

Figure 3:
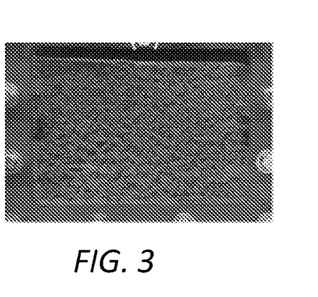
FIG. 3 is an image of the fluid, from Example 1, which has pulp fiber added to the base fluid formulation, after 10 seconds of its addition to the slot.
Figure 4:
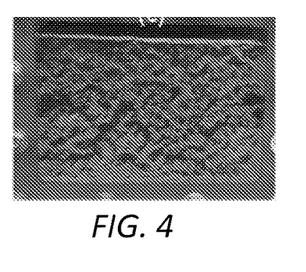
FIG. 4 is an image of the fluid, from Example 1, which has pulp fiber added to the base fluid formulation, after 2 minutes of its addition to the slot.
Figure 5:
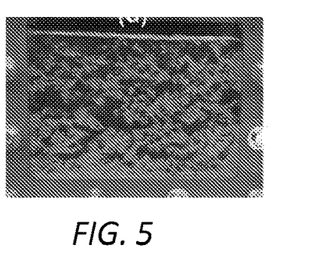
FIG. 5 is an image of the fluid, from Example 1, which has pulp fiber added to the base fluid formulation, after 5 minutes of its addition to the slot.
Figure 6:
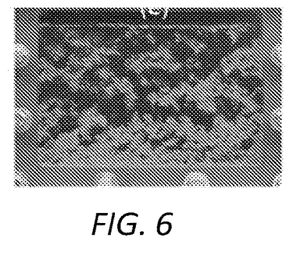
FIG. 6 is an image of the fluid, from Example 1, which has pulp fiber added to the base fluid formulation, after 30 minutes of its addition to the slot.
Figure 7:
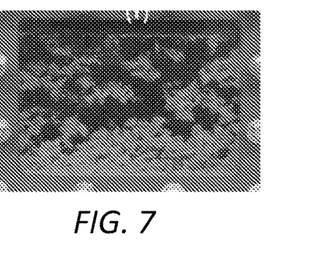
FIG. 7 is an image of the fluid, from Example 1, which has pulp fiber added to the base fluid formulation, after 2 days of its addition to the slot.

FIGS. 3-7 show images of proppant suspension in the base fluid that also has 40 lbs pulp/1000 gallons, which were recorded at different times upon aging at room temperature. The pulp fibers used had a length between about 1-7 mm and a diameter between about 20-50 microns. FIG. 3 shows an image after 10 seconds of addition to the slot, showing full proppant coverage of the slot. FIG. 4 shows an image after 2 minutes of addition to the slot, showing some settling of the proppant and the formation of small aggregations of proppant and open channels throughout the slot. FIG. 5 shows an image after 5 minutes, showing the proppant aggregates growing at a slow rate and the channels becoming bigger. FIG. 6 shows an image after 30 minutes, showing large proppant pillars forming with each pillar isolated from each other by wide channels. FIG. 7 shows an image after 2 days, showing that the proppant pillars are stable and anchored to the slot even after two days of aging.

Example 2—Bridging Testing I

To evaluate whether pulp fibers have a bridging issue, a base fluid containing guar and fibers was formulated and then poured into a funnel with a stem diameter of 3-4 mm to see if the fluid could easily pass through the funnel.

Figure 8:
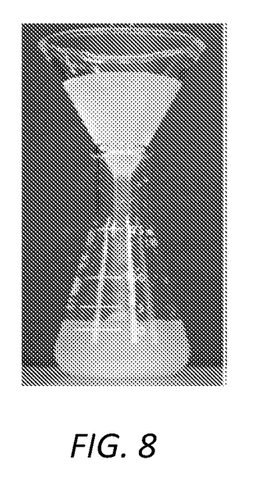
FIG. 8 is an image showing the result of the bridging testing of Example 2 after 10 minutes when using 100 mL of a fluid formulated by adding 20 lbs guar/1000 gallon and 20 lbs polylactic acid fiber/1000 gallon to tap water.

In FIG. 8 an image is presented showing the result of the above test after 10 minutes when using 100 mL of a fluid formulated by adding 20 lbs guar/1000 gallon and 20 lbs polylactic acid fiber/1000 gallon to tap water. The polylactic acid fiber was 3 mm in length crimped polylactic acid. FIG. 8 demonstrates that despite flowing smoothly through the funnel initially, the flow rate dramatically decreased and eventually totally stopped as the PLA fibers aggregated at the entrance of the funnel stem and plugged it.

Figure 9:
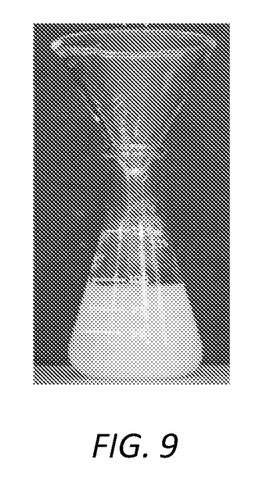
FIG. 9 is an image showing the result of the bridging testing of Example 2 after about 30 seconds when using 100 mL of fluid formulated by adding 20 lbs guar/1000 gallon and 40 lbs pulp fiber/1000 gallon to tap water.

In FIG. 9 an image is presented showing the result of the above test when using 100 mL of fluid formulated by adding 20 lbs guar/1000 gallon and 40 lbs pulp fiber/1000 gallon to tap water. The pulp fibers used had a length between about 1-7 mm and a diameter between about 20-50 microns. Due to the good dispersion and flexibility of the pulp fibers, the fluid went through the funnel smoothly in about 25 seconds without any plugging issues.

Example 3—Bridging Testing II

Figure 10:
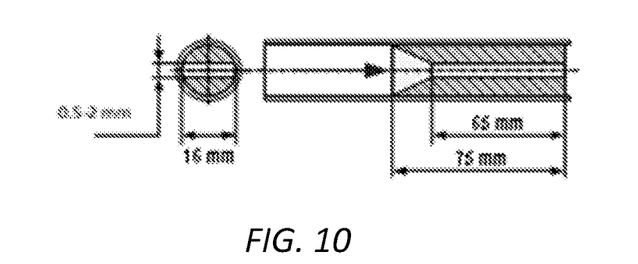
FIG. 10 is a schematic of the slot design used for the bridging testing of Example 3.

In this example bridging tests were performed using slots 16 mm in length, 65 mm in depth, and three different widths of 0.5 mm, 1 mm, and 2 mm, the slot being preceded by an angled 10 mm long concave mouth feeding to the slot. A schematic of the slot design is shown in FIG. 10. Fluids with 0.5 gallons polyacrylamide/1000 gallons tap water and 40 lbs fiber/1000 gallons tap water were mixed and flowed through the slot with controllable velocity. The fibers used in this example were PLA fibers with 3 mm length, PLA fibers with 6 mm lengths, cellulosic nano fibers with lengths of about 0.1-2 mm, and a pulp fiber with 0.5-1 mm in length.

The rate of fluid injection was varied from 10 to 800 mL/min to determine the minimum flow rate for bridging to not occur at the slot. The flow rate was transferred to linear velocity using the geometrical parameters of each slot. Bridging was estimated by monitoring pressure response and visually observing parts of the slot blocked by fiber agglomerates. The absence of pressure increases or a change in pressure of 10 psi or less during the test and/or visual formation of a fiber agglomerate at the entrance or within the slot was considered a "no bridging" result. Conversely, a change in pressure greater than 10 psi and/or the visual observation of a fiber agglomerate was considered a "bridging" result. Further, three repeated experimental runs were performed to confirm "no bridging" under a particular test condition. The results for Example 3 are shown in Table 1 below.

TABLE 1

| Fiber Type | Minimum Fluid Velocity Required to Prevent Bridging (cm/s) | | |
| --- | --- | --- | --- |
| | 0.5 mm Slot | 1 mm Slot | 2 mm Slot |
| PLA 3 mm length | Bridging Occurred @ highest velocity tested (170) | 55 | 20 |
| PLA 6 mm length | Bridging Occurred @ highest velocity tested (170) | 85 | 38 |
| Cellulosic Nano Fiber 0.1-2 mm length | No Minimum | No Minimum | No Minimum |
| Pulp Fiber 0.5-1 mm length | 52 | 12 | No Minimum |

Overall the pulp fibers gave better performance than the two commercial PLA fiber samples tested, likely due to their ability to enter the smaller slots more readily than the longer PLA fibers. The cellulosic nano fibers showed no bridging in even the smallest slot at even low velocities. This result may be due to the small fiber diameters which produces a more flexible fiber that is able to pass through narrow gaps.

Example 4—Nanofibrillated Cellulose Tested with a Variable Slot

In this example nanofibrillated cellulose having a length range from a few hundred micron to 2 mm was used as the fiber at a loading of 40 lbs/1000 gallons in a slickwater solution comprised of 0.5 gallons/1000 gallons of polyacrylamide based friction reducer, two gallons/1000 gallons of tetramethyl ammonium chloride based clay stabilizer. The proppant concentration was 1 lb 100 mesh sand per gallon of slickwater solution.

Figure 11:
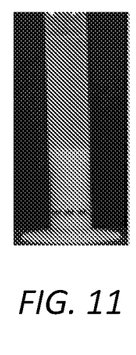
FIG. 11 is an image of the fluid described in Example 4 two hours after being injected into a 28 mm slot.
Figure 12:
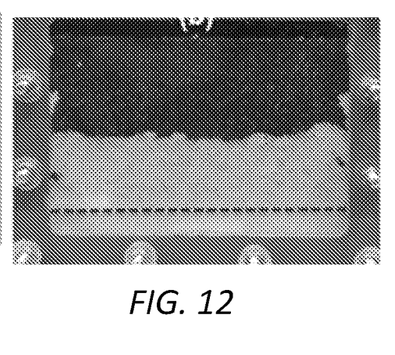
FIG. 12 is an image of the fluid described in Example 4 two hours after being injected into a 3 mm slot.
Figure 13:
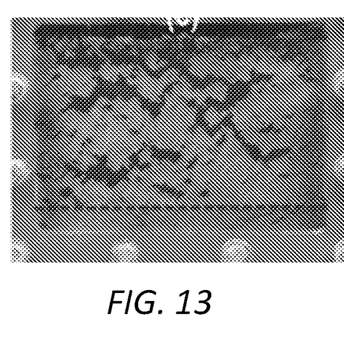
FIG. 13 is an image of the fluid described in Example 4 two hours after being injected into a 1 mm slot.

FIGS. 11-13 show images of the above fluid two hours after being injected into a 28 mm, 3 mm, and 1 mm slot, respectively. The dashed line in FIGS. 11-13 indicates the sand pack height with zero suspension (i.e., in plain tap water containing no additives). FIG. 11 shows that the sand settled by more than 60% in two hours when injected into the 28 mm diameter graduated cylinder. FIG. 12 shows that the sand settling was slightly improved when the fluid was injected into the 3 mm slot. FIG. 13 shows that the sand is well suspended and fully covers the slot. When taking the images as a whole it is clear that there is a slot size dependent phenomenon wherein optimal fiber network, anchoring, and sand suspension occurs in slots with widths comparable to the length of the fibers.

Example 5—Fixed Slot Width with Varying Fibers

In this example a slot with a 3 mm width was injected with a linear gel fluid containing 10 lbs guar/thousand gallons, one lb 40/70 Carbolite proppant/gallon slickwater, and 40 lbs fibers/thousand gallons.

Figure 14:
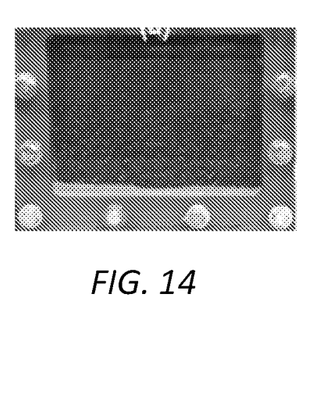
FIG. 14 is an image of the fluid containing nanocrystalline cellulose described in Example 5 two hours after being injected into a 3 mm slot.
Figure 15:
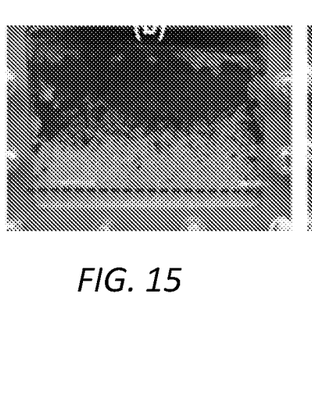
FIG. 15 is an image of the fluid containing nanofibrillated cellulose described in Example 5 two hours after being injected into a 3 mm slot.
Figure 16:
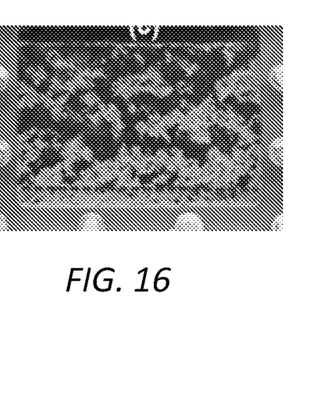
FIG. 16 is an image of the fluid containing pulp fibers described in Example 5 two hours after being injected into a 3 mm slot.

FIGS. 14-16 show images two hours after injecting into the 3 mm slot the above fluids containing nanocrystalline cellulose, nanofibrillated cellulose, and pulp fibers, respectively. The dashed line in FIGS. 14-16 indicates the proppant pack height with zero suspension (i.e., in plain tap water containing no additives). FIG. 14 shows no proppant suspension with all the proppant settling to the bottom of the slot. This result can be attributed to the nanometer size range of the nanocrystalline cellulose. FIG. 15 shows that when the micron to millimeter sized nanofibrillated cellulose was used, the proppant suspension was improved to cover about 50% of the slot. FIG. 16 shows that the millimeter sized pulp fibers provide the best proppant suspension within the 3 mm slot by forming pulp fiber networks throughout the slot by effectively anchoring to the walls of the slot. Thus, Example 5 shows that by selecting a fiber material tailored to target a particular slot width, optimal proppant suspension and placement within a fracture may occur.

Example 6—Fluid Viscosity

Figure 17:
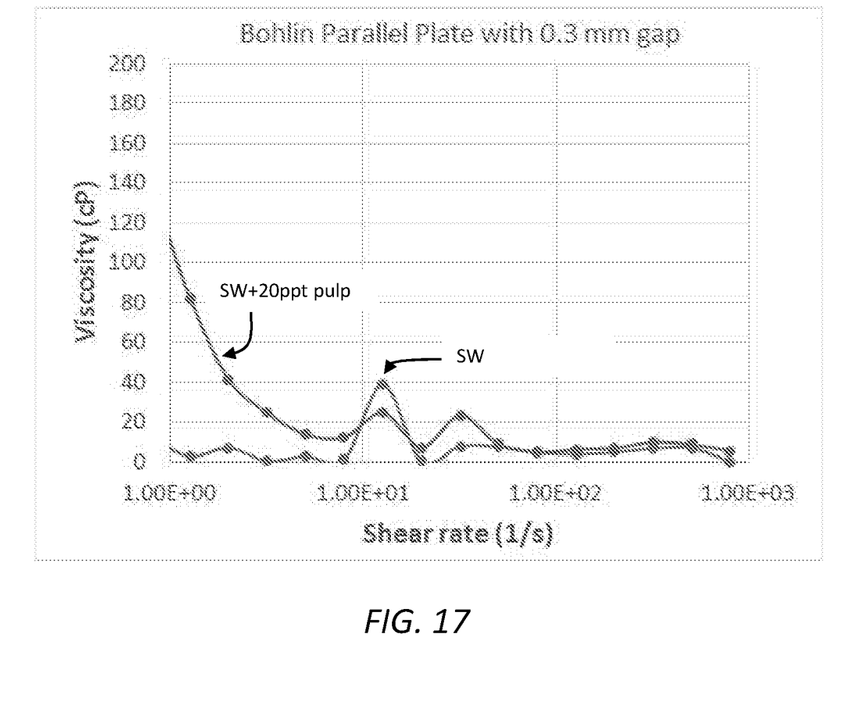
FIG. 17 shows a plot of the fluid viscosity profile of a slickwater fluid with and without pulp fibers.

A base slickwater fluid (SW) was formulated comprising 0.5 gallons/1000 gallons of polyacrylamide based friction reducer, two gallons/1000 gallons of tetramethyl ammonium chloride based clay stabilizer and its viscosity was compared to the base slickwater fluid also containing 20 lbs pulp fiber/1000 gallons (SW+20 ppt pulp). The pulp fibers used in this example were from about 0.5-1.5 mm in length. The viscosity of the fluids was measured with a Bohlin Gemini rheometer with parallel plates. FIG. 17 shows that the addition of pulp fiber (SW+20 ppt pulp) does not substantially alter the viscosity profile of the base slickwater fluid (SW), with almost no change being observed at high shear rate (e.g. 100 l/s). Thus, a slickwater fluid with fiber remains a low viscosity fluid and the suspension of the proppant/sand is because of fiber anchoring and not due to a substantial increase in viscosity.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A fracturing fluid, comprising:
at least a first tracking fluid stage and a second tracking fluid stage, each of the stages comprising:
an aqueous base fluid;
a gel;
a proppant material; and
hydrophilic pulp fibers having a fiber length between about 0.5 to 1 mm, wherein a ratio between an estimated fracture width and the fiber length is between 0.25 and 10, and
wherein the fiber length is different in each of the stages.

2. The fracturing fluid of claim 1, wherein the hydrophilic pulp fibers are microfibrillated cellulose, having lengths between 100 nm and 500 mm.

3. The fracturing fluid of claim 1, further comprising nanofibrillated cellulose fibers, having lengths between 100 nm and 1 mm.

4. The fracturing fluid of claim 1, wherein the hydrophilic pulp fibers have a length up to about 6 millimeters.

5. The fracturing fluid of claim 1, wherein the width of the hydrophilic pulp fibers is from about 10 microns to 50 microns.

6. The fracturing fluid of claim 1, wherein the amount of hydrophilic pulp fibers used in the fracturing fluid is from about 1 lb/1000 gallons fluid to 100 lbs/1000 gallons fluid.

7. A method of performing a fracturing operation, comprising:
injecting a fracturing fluid into a wellbore, wherein the fracturing fluid comprises a gel, proppant and hydrophilic pulp fibers for transporting the proppant into fractures within a subterranean well, wherein the hydrophilic pulp fibers have a fiber length between about 0.5 to 1 mm, and wherein a ratio between an estimated fracture width and the fiber length is between 0.25 and 10.

8. A method of performing a fracturing operation, comprising:
injecting a first fracturing fluid stage having a gel and a first pulp fiber material therein into a subterranean formation; and
injecting a second fracturing fluid stage having a gel and a second pulp fiber material therein into the subterranean formation;
wherein at least one of the first or the second pulp fiber material transports proppant into fractures within the subterranean formation, wherein the first or the second pulp fiber material has a hydrophilic pulp fiber material with a fiber length between about 0.5 to 1 mm, wherein a ratio between an estimated fracture width and the fiber length is between 0.25 and 10, and wherein the estimated fracture width for the first fracturing fluid stage is different from the estimated fracture width for the second fracturing fluid stage.

9. The method of claim 8, wherein the first pulp fiber material has a shorter length than the second pulp fiber material.

10. The method of claim 9, wherein the fracturing fluid having the first pulp fiber material is injected prior to injecting the fracturing fluid having the second pulp fiber material.

11. The method of claim 10, wherein the first pulp fiber material is the hydrophilic pulp fiber material, and the second pulp fiber material is a synthetic fiber material having a longer length than the first pulp fiber material.

12. The method of claim 10, wherein the first pulp fiber material is nanofibrillated cellulose.

13. The method of claim 8, further comprising:
injecting a fracturing fluid having a third pulp fiber material therein into the subterranean formation.

14. The method of claim 13, wherein the third pulp fiber material has a longer length than both the first and second pulp fiber materials.

15. The method of claim 14, wherein the fracturing fluid having the third pulp fiber material is injected after injecting the fracturing fluids having the first and second pulp fiber materials.

16. The method of claim 14, wherein the first pulp fiber material is nanofibrillated cellulose and the second pulp fiber material is microfibrillated cellulose, and the third pulp fiber material is a synthetic fiber.

17. The method of claim 16, wherein the third pulp fiber material is polylactic acid (PLA).

* * * * *